United States Patent [19]

Menge

[11] Patent Number: 4,613,506

[45] Date of Patent: Sep. 23, 1986

[54] METHOD FOR MAKING AN ACIDIC FERMENTING DOUGH FOR THE PREPARATION OF BREAD AND BAKERY PRODUCTS, USING WASTE BREAD

[76] Inventor: Wilhelm Menge, Hauptstrasse 54, 3001 Isernhagen FB, Fed. Rep. of Germany

[21] Appl. No.: 528,252

[22] Filed: Aug. 31, 1983

[30] Foreign Application Priority Data

Sep. 4, 1982 [DE] Fed. Rep. of Germany ....... 3233001

[51] Int. Cl.⁴ .......................... A21D 2/08; A21D 8/02
[52] U.S. Cl. ........................................ 426/18; 426/19; 426/20
[58] Field of Search .............................. 426/18, 19, 20

[56] References Cited

U.S. PATENT DOCUMENTS 1,203,176  10/1916  Blacklock ............................ 426/19
2,060,264  11/1936  Swift ..................................... 426/18
2,322,940   6/1943  Kirby ..................................... 426/18

*Primary Examiner*—Sam Rosen
*Attorney, Agent, or Firm*—Schwartz, Jeffery, Schwaab, Mack, Blumenthal & Evans

[57] ABSTRACT

A fermenting dough is made from waste bread, such as pieces cut off crispbread, which is subjected to an extended fermentation process. The fermenting dough is particularly suitable for improving the baking properties of pentosans in wholemeal and refined flour, and bread baked with it has excellent improvements in flavor. Thus the product provided is obtained from cheap raw materials and can totally or partially replace traditional, natural or crystalline dough acidifying agents.

Apparatus for carrying out the method comprises a container containing rotatable cutting vanes which interact with stationary vanes.

7 Claims, 2 Drawing Figures

METHOD FOR MAKING AN ACIDIC FERMENTING DOUGH FOR THE PREPARATION OF BREAD AND BAKERY PRODUCTS, USING WASTE BREAD

FIELD OF THE INVENTION

The invention relates to the use of waste bread, large quantities of which are created in industrial bread making, e.g., in the production of sliced bread. Thus, for instance, in the production of melba toast or crispbread, about 5% of the quantity of bread produced is cut off and wasted, and not even part of this can be returned to the fresh dough for melba toast. If, for example, 10,000 tons of melba toast is produced, then 500 tons will be cut off and will therefore have to be sold at far below the true value.

DESCRIPTION OF PRIOR ART

From the article in the journal "Brot and Geback" Vol. 2, 1953, page 27 it is known that waste bread can be used in preparing fresh bread with advantageous bakery effects. At present, adding waste bread in the preparation of fresh bread involves grinding certain proportions of waste bread and adding them to the fresh bread, but although waste bread is a valuable nutrient, only a very small proportion can be re-used because of the general attitude in the trade. Moreover, in some countries regulations allow only a maximum of 3% of stale bread to be added when processing fresh bread.

BRIEF SUMMARY OF THE INVENTION

It is an object of this invention to provide a method of enabling cut-off pieces of crispbread and other waste bread to be fully reutilised as a human nutrient.

It is a further object to provide a method of obtaining a new product for food manufacture from the waste bread constituents, so that the product can be fully reutilised because it is no longer waste bread and complete instead of only partial reutilisation in the manufacture of fresh bread is consequently permitted.

It is a further object of the invention to provide apparatus suitable for carrying out the methods.

In accordance with the present invention, there is provided a method of making a fermenting dough for the preparation of bread and bakery products, comprising mixing a crumbled waste bread with wholemeal and/or refined flour constituents, water and bacteria that will ferment the waste bread, and subjecting the resulting mix to conditions causing fermentation of the waste bread components.

Apparatus particularly suitable for carrying out the process comprises driven stirring and size-reducing instruments arranged in a container on a shaft extending right through it, cutting vanes arranged on the shaft at the container inlet side and interacting with stationary opposed cutting vanes mounted on the wall of the container, and stirring vanes arranged on the shaft at the container outlet side.

In the description of the invention and the claims, all parts are by weight unless the contrary is stated explicitly.

BRIEF DESCRIPTION OF THE DRAWINGS

The accompanying drawings show two examples of an apparatus for carrying out the process.

DETAIL DESCRIPTION OF THE INVENTION

As corroborated by series of tests, the fermenting dough produced in accordance with the invention is particularly suitable for rendering bakable the pentosans in a coarse rye meal or flour. There is therefore the decisive advantage that traditional natural or crystalline acidifying agents can be completely or partially replaced by a fermenting dough according to the invention. The waste bread is thus converted by a long-term fermentation process to a new product that can have many unexpected advantages.

The fermenting dough obtained comprises lactic and acetic acids and has acid values of from about 20 to 30, so that it can be used as a dough acidifying agent for wholemeal rye breads.

Thus, since a completely new substance for the preparation of bread and bakery products is obtained by a bacteriological fermentation process, all the waste bread constituents can be used to prepare fresh bread. The product obtained can be made from very cheap raw materials and has properties that are ideal for the preparation of bread and bakery products.

It has proved particularly advantageous to use bacteria that form homofermenting and/or heterofermenting lactic and acetic acid, e.g. *lactobacillus brevis* and *fermenti*.

It has also been found that the waste bread fermenting process can be carried out without any application of heat and within the temperature range about 20° to 30° C., although, when no heat is applied, the process takes slightly longer to reach certain acid values.

Good results in respect of acid values have been obtained when a mixture of up to 85 parts of crumbled waste bread and approximately 15 parts of wholemeal cereal, preferably wholemeal rye, was used. It was stirred for about 15 to 40 hours at temperatures from 20° to 30° C.

Figure 1:
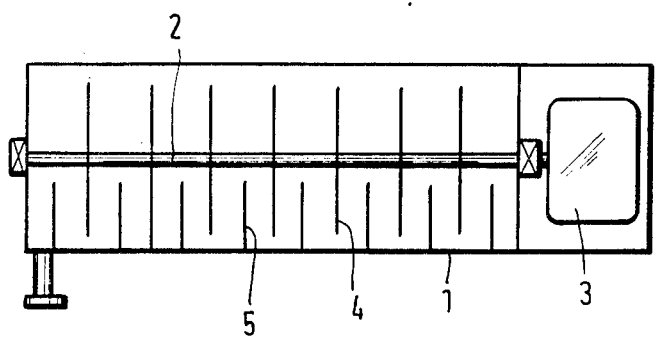
FIG. 1 is a single-chamber container in highly diagrammatic form.

In the drawings, single chamber container 1 in FIG. 1 has a shaft 2 extending right through it and mounted at both sides, the shaft being set in rotation by means of a drive motor 3 and a gearing (not shown) which is interposed if required.

Cutting vanes 4 are arranged on the shaft 2 and interact with stationary opposed cutting vanes 5 mounted on the wall of the container. All the constituents necessary to carry out the process are introduced through an inlet (not shown) to the container, are reduced in size and are subjected to the fermentation; the agitation times may be controlled by a switching mechanism.

Figure 2:
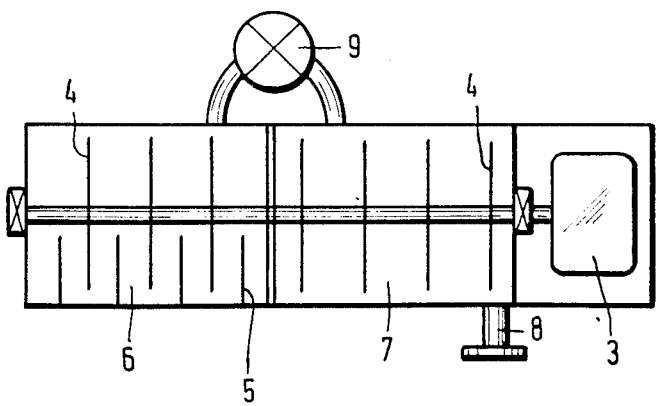
FIG. 2 is a double-chamber container.

A double chamber container with chambers 6 and 7, including a pumping-over mechanism 9 is shown in FIG. 2. The chamber 6 is for size reduction and fermentation, while the fermenting dough formed is stored in the chamber 7 and can be discharged through pipe connection 8.

Both the double and the single chamber container may be arranged either horizontally or vertically, depending on conditions at the place where it is installed. Larger concerns may operate with two completely separate containers, with a pumping-over mechanism of appropriate size arranged between them.

The apparatus of the present invention has the advantages that the waste bread crumbling process and the stirring and degassing process for the assembled mixture can be carried out in one container, and that the crumbling instruments are arranged at the inlet side of the container, on a driven shaft extending right through it, and the stirring instruments are arranged behind them.

A container comprising two chambers is particularly advantageous for smaller concerns; the disintegration and the decomposition of the mixture of waste bread with water are carried out in the first chamber, while the second chamber is designed as a store for the fermenting dough. When the disintegrating and stirring mechanism for the fermentation process is switched on, the stirring mechanism in the second chamber runs with it and provides for additional degassing of the dough formed, which is advantageous.

An illustrative example of the production and utilisation of dough will now be given.

EXAMPLE

A mixture of 85 parts of waste bread, 15 parts of coarse rye meal, 100 parts of water and 10 parts of a low-viscosity mixture of cultures of bacterial forming lactic and acetic acid (*lactobacillus brevis*) was stirred at about 25° C. for approximately 30 hours. The acid value was then found to be 22.6, indicating that a very mild fermenting dough had been formed.

The acid formed was used to produce a mixed rye bread and a series of tests showed that the baking properties of the pentosans were considerably improved and in particular that an improvement in aroma was obtained, that was far above average in the direction of a mildly acidified rye bread.

The fermentation process, which goes along with acidification, had obviously brought about positive changes in the constituents of the waste bread component. The changes involve (a) the swelling behaviour of the starch and pentosan component of the waste bread material, to which the consistency reading is relevant, and (b) the formation of aromatic components, which have to do with the fact that, as a result of the preceding baking process, the constituents of the waste bread are more readily fermentable than those of flour that has not been heat treated. The fermenting dough thus fulfils additonal functions, for which such materials as stock cubes, self-raising flours and baking agents are normally used.

Thus it has been found unexpectedly that a fermenting dough can be made from waste bread, after about 20 hours' fermentation, to form a dough-acidifying agent that is particularly suitable for baking breads complying with the known quality requirements. The breads do not differ from those made with conventional leavening or baking agents, either in their nutritive or gastronomic value or in their suitability.

The method of fermenting waste bread according to the invention provides a novel way of utilising these materials. It involves the surprising realisation that the fermentation process with waste bread as the substrate gives a fermenting dough with unexpected properties. The dough can be used for making bakery products with normal acidification. Use of the fermenting dough does not bring with it the unfavourable effects on the quality of the bread which are produced when waste bread is used directly as an additive to the dough. The breads do not lose either any of their nutritive or gastronomic value or their suitability as a result of using waste bread.

What is claimed is:

1. A method of making an acidic dough for the preparation of bread and bakery products, comprising the steps of (1) mixing an aqueous mixture comprised of flour and waste bread with a culture of lactic and acetic acid bacteria and (2) stirring the resulting mixture at a temperature in the range of about 20° to 30° C. for a period of 15 to 40 hours, such that an acidic dough is produced by fermentation of said waste bread by said bacteria.

2. A method as claimed in claim 1, wherein said bacteria are heterofermenting and/or homofermenting bacteria.

3. A method as claimed in claim 1, wherein fermentation of the waste bread is carried out with intermittent stirring of the mixture without the application of heat.

4. A method as claimed in claim 1, wherein fermentation of the waste bread is carried out at a temperature of approximately 27° C. for a period of about 30 hours.

5. A method as claimed in claim 1, wherein step (1) comprises mixing about 85 parts by weight of waste bread, about 15 parts by weight of rye flour and 100 parts by weight of water with about 10 parts by weight of a bacterial culture forming lactic and acetic acid.

6. A method as claimed in claim 1, wherein said flour is wholemeal or refined.

7. An acidic dough produced by a process comprising the steps of (1) mixing an aqueous mixture comprised of flour and waste bread with a culture of lactic and acetic acid bacteria and (2) stirring the resulting mixture at a temperature in the range of about 20° to 30° C. for a period of 15 to 40 hours, such that said acidic dough is produced by fermentation of said waste bread by said bacteria.

* * * * *